Sept. 22, 1936.  T. H. BEARD ET AL  2,055,141
CORRECTION DEVICE
Filed Feb. 24, 1933  2 Sheets-Sheet 1
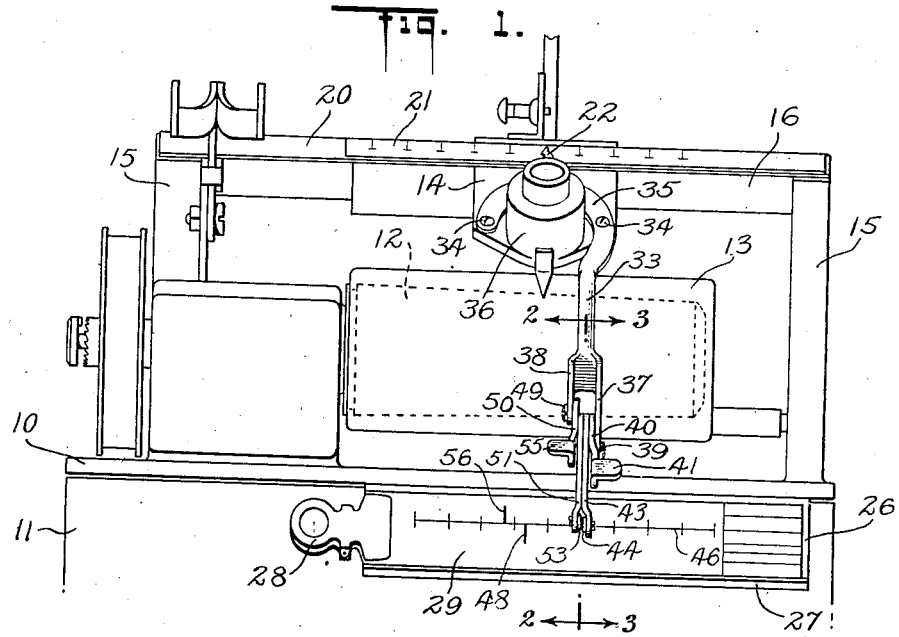
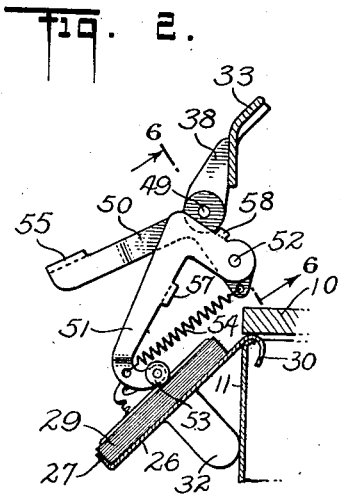
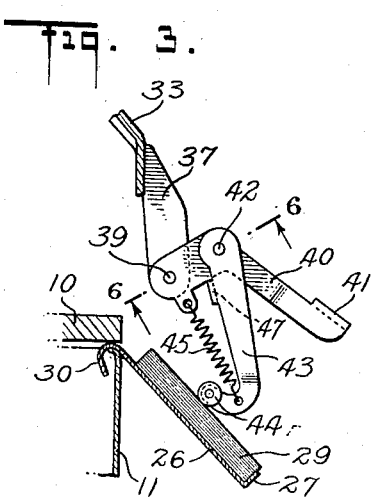
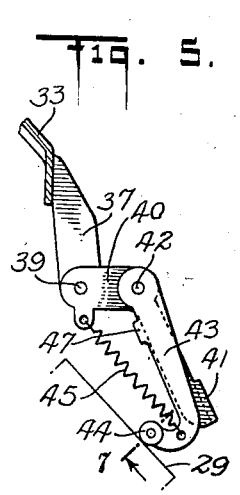
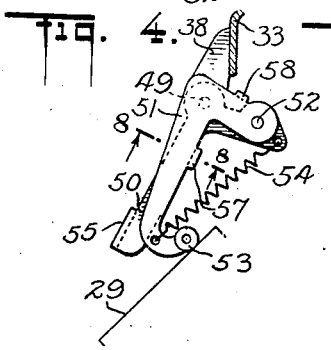
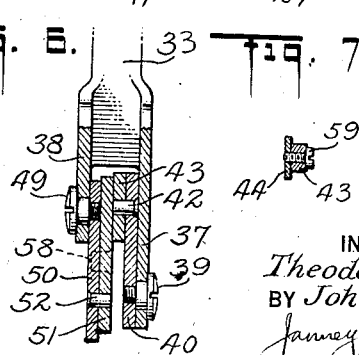
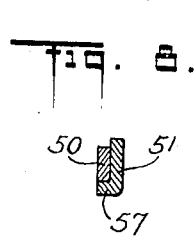
INVENTORS
*Theodore H. Beard*
BY *John E. Rienholdt*
*Janney, Blair & Curtis*
ATTORNEYS

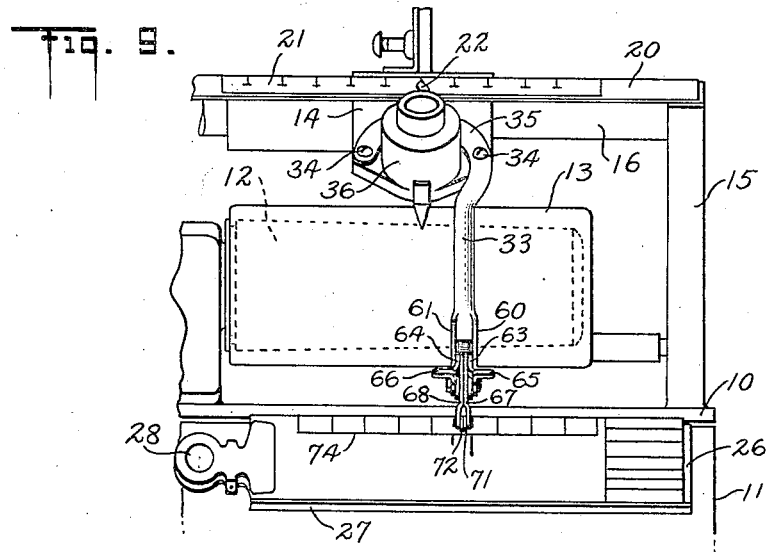

Patented Sept. 22, 1936

2,055,141

UNITED STATES PATENT OFFICE 2,055,141

CORRECTION DEVICE

Theodore H. Beard and John E. Renholdt, Bridgeport, Conn., assignors to Dictaphone Corporation, New York, N. Y., a corporation of New York Application February 24, 1933, Serial No. 658,312

4 Claims. (Cl. 234—1)

This invention relates to correction devices for phonographs; and particularly to that type of phonograph which is adapted to commercial use, in which is employed a recorder for recording dictation and a reproducer for reproducing dictation. In connection with phonographs of this character it has been usual to employ memorandum sheets, each sheet having printed thereon a scale corresponding to a scale on the phonograph, upon which sheet the dictator may note certain instructions and corrections, this memorandum sheet being turned over to the transcriber as a guide in transcribing the record. Devices for this purpose heretofore proposed have consisted of various forms.

According to one form, a correction sheet marking device is provided comprising a plurality of instrumentalities adapted to indicate different instructions by marks of different lengths extending transversely of the indication sheet.

An object of the present invention is to provide an improved marking device for indicating different instructions on a suitable memorandum sheet by marks which may be of different lengths or be differently located with respect to a scale printed on the sheet.

Other objects will be in part obvious and in part pointed out hereinafter.

The invention accordingly consists in the features of construction, combination of elements, and arrangements of parts as will be exemplified in the structure to be hereinafter described and the scope of the application of which will be indicated in the following claims.

In the accompanying drawings, in which are shown two of the various possible embodiments of the invention:

Fig. 1 is a front elevation of the upper part of a dictation machine with a marking device made in accordance with one embodiment of the present invention applied thereto;

Fig. 2 is a vertical section through the marking device on the line 2—2 of Fig. 1, showing parts thereof in their normal position;

Fig. 3 is a vertical section through the marking device on line 3—3 of Fig. 1, showing other parts thereof in their normal position;

Fig. 4 is a view similar to Fig. 2 showing the parts in operated position;

Fig. 5 is a view similar to Fig. 3 showing the parts in operated position;

Fig. 6 is a section taken on line 6—6 of Figs. 2 and 3;

Fig. 7 is a cross-section on line 7—7 of Fig. 5;

Fig. 8 is a cross-section on line 8—8 of Fig. 4;

Fig. 9 is a view similar to Fig. 1, with parts of the dictation machine omitted, and showing a different embodiment of my invention;

Fig. 10 is a right side elevation of the marking device shown in Fig. 9;

Fig. 11 is a left side elevation thereof;

Fig. 12 is an elevation similar to Fig. 10 showing one marking member in operated position;

Fig. 13 is an elevation similar to Fig. 11 showing a second marking member in operated position;

Fig. 14 is a side elevation similar to Fig. 10 showing the marking members in an inoperative position; and Fig. 15 is a cross-section on line 15—15 of Fig. 10.

Similar reference characters refer to similar parts throughout the various views of the drawings.

In general, the indication-marking device comprises a support for memorandum sheets, an indicator, and means whereby the indicator and support have relative movement in proportion to the relative movement of the sound-box and record tablet; said indicator comprising a plurality of marking means adapted alternatively to be operated by the dictator to make relatively distinguishable marks extending transversely of the record sheet to indicate different instructions or suggestions, as, for example, a long mark may be employed to mean the beginning and ending of a letter and a short mark may be used to indicate that a correction has been made in dictating. Again, marks of the same length may be employed for this purpose but be differently positioned upon the sheet with reference to a line or scale printed thereon.

The correction device is preferably so mounted with respect to the pad of memorandum sheets, each sheet of which has a scale extending longitudinally thereof, that each marker will make its mark upon the sheet, in a manner as will appear as the alternative embodiments of this invention are described.

Only so much of the dictation machine is shown as will serve to make clear the application of the invention thereto.

The base 10 of the machine is supported on a motor box 11 containing mechanism (not shown) for imparting rotation to the mandrel 12 on which the record tablet 13 is mounted, and for moving the sound-box carriage 14 longitudinally thereover. Arising from the base 10 at either end thereof are a pair of standards 15, extending between which is a hollow carriage guide rod or tube 16 along which the carriage is movable. This tube is adapted to contain a feed-screw (not shown) for imparting movement to the carriage axially of the record tablet. Mounted on the front part of the standards 15 is a bar 20, to the face of which is attached a scale member 21. Along the scale 21 a pointer 22 is adapted to move as the carriage travels. The carriage supports suitable means (not shown) adapted to trace a sound line on the surface of the record tablet.

A support is provided for the pad composed of superimposed memoranda or correction sheets, and preferably this support comprises tray 26, provided with a longitudinal positioning flange 27 and clamping means 28, said tray being of a size suitable to receive a pad of correction sheets, as indicated at 29. The pad is placed on the tray with its lower edge against the flange 27 and is held in place by the clamp 28. The tray is further provided with a hook 30 adapted to be received between the base of the machine and the motor casing 11. Any suitable means may be employed to hold the tray in any desired position longitudinally of the machine. The support of the tray is preferably such that said tray is inclined to the horizontal in order that the correction sheets may be in a plane substantially at right angles to the line of sight. In the form shown said tray is also provided with a plurality of lugs 32 designed to engage the surface of the cabinet to prevent the tray from tilting downwardly out of its proper position.

An indication-marking device is provided to have movement over the correction sheet or sheets supported on the tray 26, said movement being in proportion to the travel of the sound-box over the record tablet. In the form shown, said device comprises an arm or bracket 33 secured to the front of the carriage by means of the screws 34, said arm being curved at 35, to embrace the forward projection 36 of the carriage, and extends downwardly toward the tray 26.

At its lower end the bracket 33 is bifurcated as shown in Fig. 1 to provide two supporting arms 37 and 38. Of these arms, 37 is longer than 38 and supports at its end by means of a pivot screw 39 a bent lever 40 pivoted at one of its ends upon the said screw 39 and having provided at its other end a fingerpiece 41. Substantially at the elbow of this bent lever is pivoted by means of a rivet 42 a marker arm 43 terminating at its lower end in a sort of a goose neck to which a marker 44 is secured. The marker in the normal position of the parts rests upon the top sheet 29 of the pad and the parts are biased in the position shown in Fig. 3 by means of a spring 45 extending between the lever and the marker arm. In its normal position the marker 44 makes contact with the indication sheet as the carriage moves substantially along a line 46 extending longitudinally of said sheet. This line forms a base line for a scale having the division marks of which cross said line 46 to extend slightly above and below said line.

It will be obvious that when the fingerpiece 41 is depressed the marking arm 43 will be moved downwardly toward the bottom of the indication sheet and the marker 44 will make a straight line transversely of the sheet extending from the longitudinal line 46 a distance determined by the engagement of the lower surface of lever 40 with an offset lug 47 extending laterally from the lower edge of the arm 43. In the normal or raised position of the lever 41 the rear edge of the lug 47 engages another portion of the lever 40 to fix the relation of arm and lever when in unoperated position. In Fig. 1 the downwardly extending mark made by this marker is indicated by the numeral 48. Fig. 5 shows the marker 44 in its lower position, that is, the position it occupies at the lower end of mark 48.

In a similar manner the short arm 38 of bracket 33 pivotally supports by means of a screw 49 a second marking lever 50 shown in Fig. 2 in its normal or unoperated position. It is to be noted that this lever is pivotally mounted at its elbow instead of at the end of one of its arms, this arrangement differing from the mounting of lever 40 in this respect. A bent marker arm 51 is pivoted adjacent the lower end of the short arm of lever 50, as by means of a rivet 52, and extends downwardly with a marker 53 held in contact with the top sheet of the pad. A spring 54 normally holds these parts in the position shown in Fig. 2, and it will be obvious by reference to this figure that when the fingerpiece 55 of the lever 50 is depressed the marking arm 51 will be drawn upwardly with reference to the correction sheet and marker 53 will make a mark 56 upon the correction sheet which extends upwardly from the longitudinal line 46. This mark may be of the same length as mark 48 or of a different length, depending upon the lengths of the lever arms and upon the setting of the limiting lugs carried by the arm 51.

One of these lugs 57 corresponds with lug 47 of the marker arm 43 and operates in the same way to limit the downward movement of lever 50. The relative motion of lever 50 and arm 51 in a direction to widen the angle between them is limited by means of a lug 58 extending laterally from the rear edge of the short arm of marker arm 51 and providing means adapted to engage a portion of the short arm of lever 50 to prevent further separation of the lever and marker arm in an angular direction. The offset character of this lug is clearly shown in dotted lines in Fig. 6. The conformation of the lug 57 is best shown in Fig. 8.

It will be understood that lugs 47 and 57 are exactly alike except that they occupy slightly different positions upon the underside of their respective marker arms and that one is turned to the right while the other is turned to the left as viewed from the front of the machine. Fig. 7 is taken on line 7—7 of Fig. 5 and shows the marker 44 in enlarged detail. Marker 53 is exactly the same. It comprises a small disk made of some metallic alloy which will make a mark like a pencil upon the surface of the correction sheet and is secured to the end of the arm 43 by means of a screw 59. While this member 44 does not normally rotate, it will be understood that it may be adjusted from time to time to turn a new portion of the disk toward the sheet to compensate for wear.

From the foregoing, operation of this form of the invention is obvious. The operator by manipulating either one of the finger levers may make the desired mark upon the correction sheet to indicate the beginning or ending of a letter or a point upon the record-cylinder where a correction is to be made in transcribing, and it will be clear that with this form of the device the marks made upon the correction sheet will be clearly distinguishable one from another because of their relative positions with respect to the scale line 46.

Referring now to the modification of the invention shown in Figs. 9 to 15, it will be seen by reference to Fig. 9 that the bracket 33 is bifurcated as before but that the arms 60 and 61 are of equal length. At the lower ends of these arms, mounted in both, is a pivot screw 62 which supports a pair of marking levers 63 and 64 which are identical except for the fact that one constitutes a right and the other a left-hand member. They may be easily distinguished by reason of the fact that their fingerpieces 65 and 66 extend laterally in opposite directions. These levers are like lever 40 described above and are mounted in the same relative position as lever 40 upon the pivot member 62. Lever 63 supports a marker arm 67 and lever 64 supports a marker arm 68. Each of these arms is pivoted at the bend in its respective lever in the same way as lever 40 supports marker arm 43.

Lever 63 and arm 67 are held in their normal relative angular position, as shown in Fig. 10, by means of a spring 69. Lever 64 and arm 68 are held in their normal relative angular position, as shown in Fig. 11, by means of a spring 70. Each is provided at its lower end with a marker similar to markers 44 and 53 shown in the embodiment first described. These markers are indicated by reference numerals 71 and 72 and normally rest upon the surface of a correction sheet 73. This sheet is made with a scale extending longitudinally thereof adjacent the upper edge of the correction sheet and it will be understood that when operated both markers move downwardly beneath the scale line 74.

However, in this instance the marks are made distinguishable by reason of the fact that one is longer than the other. This results from the fact that while both sets of levers and marker arms are held in exactly the same relation in their normal unoperated position, in the one case, when operated, movement of the operating lever is stopped when less angular motion has taken place between lever and arm than when the other set is operated. Marker arm 67 is provided with a lug 75 similar in all respects to the lugs 47 and 57 hereinbefore described. This lug engages the lower side of lever 63 when the latter is depressed to the limit and engages another part of the lever 63 when that lever is returned to its normal position by means of the spring 69. Lever 64 is held in its normal unoperated position with reference to marking arm 68 by means of a similar lug 76, but is stopped in its operated position so that marker 72 produces a shorter line than marker 71 by reason of the engagement of a pin 77 with the lower side of the lever 64. This pin projects outwardly from a side of the arm 68 into the path of the lever 64.

The mode of operation and the use of the present embodiment will be understood from what has gone before. Depression of either lever by the operator will cause its respective marker to make its characteristic mark upon the memorandum sheet in proper relation to the scale line. The correction sheet may be furnished with printed instructions telling the significance of each mark made.

We have shown in connection with the marking device construction now being described, means for preventing dislocation of the top sheet of the pad with reference to the sheets lying beneath. When either of the levers 63 or 64 is depressed causing its respective marker elements 71 or 72 to move downwardly over the sheet, there is a tendency for the sheet to move in the direction the marker is moving. To prevent this there is mounted upon the pivot 62 between the hubs of the levers 63 and 64 a spring arm 78 to the lower side of which is secured a curved leaf spring 79 by any suitable means, as by screw 80. Its lower end, when the parts are in the position shown in Fig. 10, will normally move along the surface of the paper without friction. When, however, either of the arms 63 or 64 is depressed the point of the spring 79 is pressed tightly down upon the top correction sheet by means of cam surfaces 81 or 82 formed eccentrically upon the hubs of the respective levers. It will be noted by reference to Fig. 15 that the spring 79 is broad enough to be engaged by the hub of either lever.

It is often desirable to swing both marking devices upwardly about their pivot in order that the markers may be withdrawn from the surface of the pad and also in order that the point of spring 79 may be lifted clear of the surface of the pad. This position may be designated the "inoperative" position of the marking device and is indicated in Fig. 14. In order that the marking device may be resiliently held in either its operative or inoperative position, a spring member 83 is secured to the underside of bracket 33 in any suitable manner so as to project downwardly beyond a rearwardly extending part 84 carried by the spring arm 78. In the present drawings this part is shown as an extension or continuation of leaf spring 79 but it will be understood that it may be a separate member or be formed integrally with the arm 78. The contact between the part 84 and spring 83 normally holds the marking devices in their operative positions, as shown in Figs. 10 and 11, 12 and 13, and prevent them from inadvertently assuming the inoperative position shown in Fig. 14. When, however, it is desired to throw the levers into inoperative position, as when it may be desired to replace the correction sheet pad or tear off a sheet from the correction pad, the backs of levers 63 and 64 will engage spring arm 78 carrying it rearwardly to the position shown in Fig. 14 and thus rearwardly deflect spring member 83. In moving from the position shown in Fig. 10 to the position shown in Fig. 14 a dead center point will be passed so that the tendency of the spring 83 is to hold the spring arm 78 in either position.

It will be seen from the foregoing that the present invention is one well adapted to carry out all of the aims and objects hereinbefore set forth and that in its peculiar features of construction it provides a positively operated device which may be easily operated and adjusted; that it is of durable construction and that when necessary the parts may be easily replaced. It will also be seen that while the two embodiments vary slightly in construction and function in a slightly different manner, they both fall within the same inventive conception.

As many possible embodiments may be made of the above invention without departing from the scope thereof, it is to be understood that all matter herein set forth or shown in the accompanying drawings is to be interpreted as illustrative and not in a limiting sense.

We claim:

1. In apparatus of the character described, in combination, a frame, a movable carriage, an instruction-indication sheet in fixed relation to said frame, a lever pivotally mounted on said carriage in operative relation to said indication sheet, a marking member pivotally mounted on said lever, and means adapted to coact with said lever to prevent displacement of said sheet by said marking member.

2. In apparatus of the character described, in combination, a frame, a movable carriage, an instruction-indication sheet in fixed relation to said frame, a lever pivotally mounted on said carriage in operative relation to said indication sheet, a marking member pivotally mounted on said lever, resilient means adapted to move with said carriage relatively to said indication sheet, and means on said lever adapted to coact with said resilient means to prevent displacement of said sheet by said marking member.

3. In a correction device for dictating machines, the combination of an instruction-indication sheet having a surface exposed to receive markings, a bracket having its free end movable along a path parallel to said surface, a first lever pivotally mounted at the free end of the bracket, a second lever pivotally mounted on said first lever, a marker carried by said second lever, a spring connecting said levers, a fixed abutment positioned to retain said levers in predetermined angular relationship under the influence of said spring, said levers being rotatable together about the pivotal mounting of the first lever on the bracket to bring said marker into or out of engagement with said sheet, and a finger piece on said first lever whereby said lever may be rotated relatively to said second lever against the reaction of said spring with said marker in engagement with said sheet to effect a movement of said marker across the surface of said sheet for making a mark thereon.

4. In a correction device for dictating machines, the combination of an instruction-indication sheet having a surface exposed to receive markings, a bracket having its free end movable along a path parallel to said surface, a first lever pivotally mounted at the free end of the bracket, a second lever pivotally mounted on said first lever, a marker carried by said second lever, a spring connecting said levers, a fixed abutment positioned to retain said levers in predetermined angular relationship under the influence of said spring, said levers being rotatable together about the pivotal mounting of the first lever on the bracket to bring said marker into or out of engagement with said sheet, a finger piece on said first lever whereby said lever may be rotated relatively to said second lever against the reaction of said spring with said marker in engagement with said sheet to effect a movement of said marker across the surface of said sheet for making a mark thereon, and means on one lever engageable by the other for limiting the extent of the mark-making movement of said marker.

THEODORE H. BEARD.
JOHN E. RENHOLDT.